(12) United States Patent
Braden et al.

(10) Patent No.: US 8,031,458 B2
(45) Date of Patent: Oct. 4, 2011

(54) CURRENT RETURN NETWORK

(75) Inventors: Stephen M. Braden, Everett, WA (US);
Michael J. Doherty, Seattle, WA (US);
Stephen M. Scott, Arlington, WA (US)

(73) Assignee: The Boeing Company, Chicago, IL (US)

( * ) Notice: Subject to any disclaimer, the term of this patent is extended or adjusted under 35 U.S.C. 154(b) by 558 days.

(21) Appl. No.: 12/276,979

(22) Filed: Nov. 24, 2008

(65) Prior Publication Data
US 2010/0127564 A1    May 27, 2010

(51) Int. Cl.
*H05F 3/00* (2006.01)
(52) U.S. Cl. .................................... 361/218
(58) Field of Classification Search ............ 361/218
See application file for complete search history.

(56) References Cited

U.S. PATENT DOCUMENTS

| | | | | |
|---|---|---|---|---|
| 4,380,039 A | * | 4/1983 | King ............................ | 361/218 |
| 4,671,583 A | * | 6/1987 | Olson et al. .................... | 439/92 |
| 5,843,567 A | * | 12/1998 | Swift et al. ..................... | 428/221 |
| 7,642,975 B2 | * | 1/2010 | Brunks et al. ................. | 343/705 |

OTHER PUBLICATIONS

Warwick, "Integration Lab Reduces Risk in 787's More-Electric Systems," Aviation Week Intelligence Network, 4 pages, 2008.
Esparza, "Un mexicano en boeing," Escala Imprimir Articula, 4 pages (with partial English translation of the first two paragraphs in the right side column, p. 1), 2008.

* cited by examiner

*Primary Examiner* — Stephen W Jackson
(74) *Attorney, Agent, or Firm* — Klintworth & Rozenblat IP LLC

(57) ABSTRACT

A composite moving apparatus made substantially of composites may include a plurality of longitudinal conductive electrical pathways extending along a substantial length of the composite moving apparatus, and a plurality of lateral conductive electrical pathways extending along a substantial lateral width of the composite moving apparatus. The longitudinal and lateral conductive electrical pathways may be connected in order to provide redundant electrical pathways extending along a substantial portion of the composite moving apparatus. The redundant electrical pathways may carry return current, carry fault current, provide grounding, carry lightning current, provide electromagnetic shielding, minimize resistance and voltage differential, and/or provide a bleed path for electrostatic charge.

25 Claims, 3 Drawing Sheets

CURRENT RETURN NETWORK

FIELD OF THE DISCLOSURE

The disclosure relates to conductive electrical pathways disposed in apparatus.

BACKGROUND OF THE DISCLOSURE

Many moving apparatus, such as aircraft, spacecraft, ships, satellites, vehicles, and other types of moving apparatus, are made of metal and utilize their metal panels and structures in order to provide conductive electrical pathways for the return of normal direct current and alternating operating current, carrying fault currents, providing grounding, earning lightning current, providing electromagnetic shielding, minimizing resistance and voltage differentials, and/or for providing bleed paths for electrostatic charge. However, the use of metal structures and metal panels in moving apparatus increases cost and weight. Alternatively, discrete wiring has been used to serve one or more of these functions. However, the wiring may not provide redundancies required to accommodate for faults in the system, and/or may not be adapted to handle all of these functions. Modem moving apparatus may be made of composites in order to reduce weight, save cost, increase strength, and/or provide other benefits. In these composite modern moving apparatus, conductive electrical pathways are needed which do not rely on metal panels and structures, which are redundant to accommodate for faults in the system, and which are adapted to handle all of the above listed functions.

An apparatus and/or method is needed to decrease one or more problems associated with one or more of the existing apparatus and/or methods.

SUMMARY OF THE DISCLOSURE

In one aspect of the disclosure, a composite moving apparatus is disclosed. The composite moving apparatus may comprise: a moving apparatus made substantially of composites; a plurality of longitudinal conductive electrical pathways extending along a substantial length of the composite moving apparatus; and a plurality of lateral conductive electrical pathways extending along a substantial lateral width of the composite moving apparatus. The longitudinal and lateral conductive electrical pathways may be connected in order to provide redundant electrical pathways extending along a substantial portion of the composite moving apparatus for at least one of earning return current, carrying fault current, providing grounding, earning lightning current, providing electromagnetic shielding, minimizing resistance and voltage differential, and providing a bleed path for electrostatic charge.

In another aspect of the disclosure, a method is disclosed for providing conductive electrical pathways in a composite moving apparatus. In one step, a composite moving apparatus made substantially of composites may be provided. In another step, a plurality of longitudinal conductive electrical pathways extending along a substantial length of the composite moving apparatus may be provided. In an additional step, a plurality of lateral conductive electrical pathways extending along a substantial lateral width of the composite moving apparatus may be provided. In still another step, the longitudinal conductive electrical pathways may be connected to the lateral conductive electrical pathways. This may provide redundant electrical pathways extending along a substantial portion of the composite moving apparatus. The redundant electrical pathways may at least one of carry return current, carry fault current, provide grounding, carry lightning current, provide electromagnetic shielding, minimize resistance and voltage differential, and provide a bleed path for electrostatic charge.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
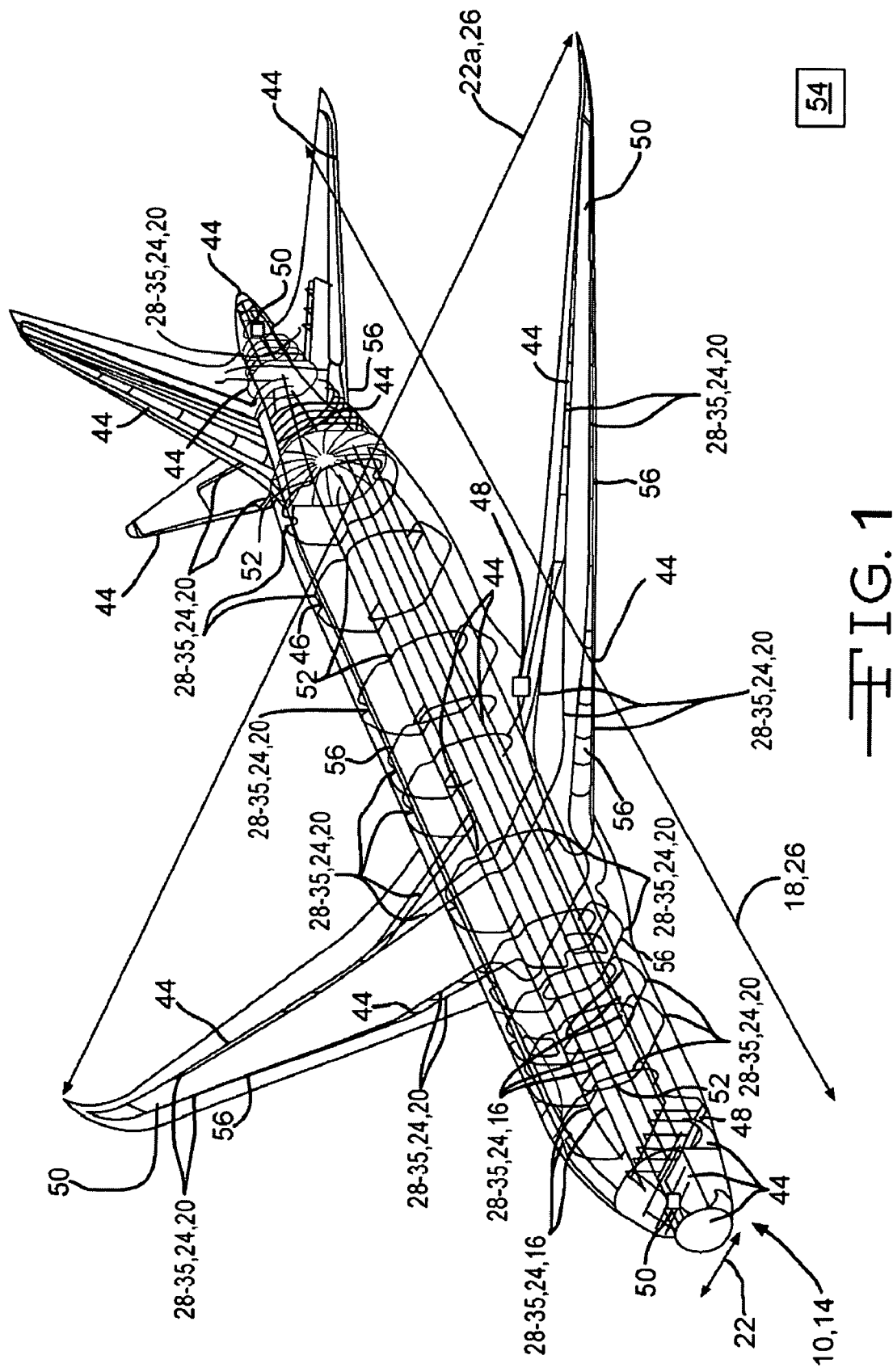
FIG. 1 shows a perspective view of one embodiment of a composite moving apparatus.

FIG. 1 shows a perspective view of one embodiment of a composite moving apparatus 10. The composite moving apparatus 10 of FIG. 1 is a composite aircraft. However, in other embodiments, the composite moving apparatus 10 may comprise a composite ship, a composite spacecraft, a composite satellite, a composite vehicle, a carbon fiber moving apparatus, and/or another type of composite moving apparatus. The composite moving apparatus 10 may be made substantially of composites 14. A plurality of longitudinal conductive electrical pathways 16 may extend along a substantial length 18 of the composite moving apparatus 10, and a plurality of lateral conductive electrical pathways 20 may extend along substantial lateral widths 22 and 22a of the composite moving apparatus 10. The longitudinal conductive electrical pathways 16 may comprise low resistance electrical pathways, made of wire, metal, or other conductive material, running lengthwise 18 within the composite moving apparatus 10. The lateral conductive electrical pathways 20 may comprise low resistance electrical pathways, made of wire, metal, or other conductive material, running across the width 22 or circumferential within the composite moving apparatus 10.

The longitudinal and lateral conductive electrical pathways 16 and 20 may be connected to one another in order to provide redundant electrical pathways 24 extending along a substantial portion 26 of the composite moving apparatus 10. The redundant electrical pathways 24 may be adapted to carry return alternating and/or direct current return current 28, to carry fault current 29, to provide grounding 30, to carry lightning current 31, to provide electromagnetic shielding 32, to minimize resistance and voltage differential 33, and to provide a bleed path 34 for electrostatic charge 35. The longitudinal and lateral conductive electrical pathways 18 and 20 may be segmented to facilitate design, build, or maintenance. The segments may be connected together with electrical joints 52.

The composite moving apparatus 10 may further comprise at least one conductive metal structure 44 disposed within the composite moving apparatus 10. The at least one conductive metal structure 44 may comprise a beam, a frame, a bulkhead, a cage, a plate, and/or another type of conductive metal structure. The longitudinal and lateral conductive electrical pathways 16 and 20 may be connected to the at least one conductive metal structure 44 to utilize the structure 44 as part of the electrical pathways 16, 20, and 24. Two or more of the longitudinal conductive electrical pathways 16 may be disposed parallel to one another to provide pathway redundancy. Some of the other longitudinal conductive pathways 16 may be disposed in non-parallel arrangement. In other embodiments, the longitudinal conductive electrical pathways 16 may be disposed in varying arrangements. Two or more of the lateral conductive electrical pathways 20 may be disposed parallel to one another to provide pathway redundancy. Some of the other lateral conductive pathways 20 may be disposed in non-parallel arrangement. In other embodiments, the lateral conductive electrical pathways 20 may be disposed in varying arrangements. The lateral and longitudinal conductive electrical pathways 16 and 20 may be made of wire, extruded metal, metal, copper, aluminum, and/or other type of conductive material. The lateral and longitudinal conductive electrical pathways 16 and 20 may be fastened to or supported from a structure 46 of the composite moving apparatus 10.

The lateral and longitudinal conductive electrical pathways 16 and 20 may be connected to at least one electrical source 48 and may also be connected to at least one piece of equipment 50 powered by the electrical source 48. The at least one electrical source 48 may comprise at least one of an engine, a battery, a converter, a rectifier unit, a generator, and/or another type of electrical source. The at least one piece of equipment 50 may comprise at least one of navigation equipment, avionics equipment, control equipment, entertainment equipment, communication equipment, lighting equipment, environment control equipment, actuator equipment, power distribution equipment, and/or other type of electrically-controlled equipment. Electrical joints 52 may connect the lateral and longitudinal conductive electrical pathways 16 and 20 and/or conductive metal structure 44.

A computer program 54 may have been used to determine locations, configurations, orientations, sizing, and/or quantities of the lateral and longitudinal pathways 16 and 20 in the composite moving apparatus 10 in order to reduce weight, to meet performance requirements, to reduce costs, and to efficiently provide comprehensive conductive electrical pathways 16, 20, and 24 throughout the composite moving apparatus 10. The lateral and longitudinal conductive electrical pathways 16 and 20 may have been pre-installed in a plurality of sections 56 of the composite moving apparatus 10, and the pre-installed lateral and longitudinal conductive electrical pathways 16 and 20 may have been connected when the sections 56 were joined during assembly of the composite moving apparatus 10.

Figure 2:
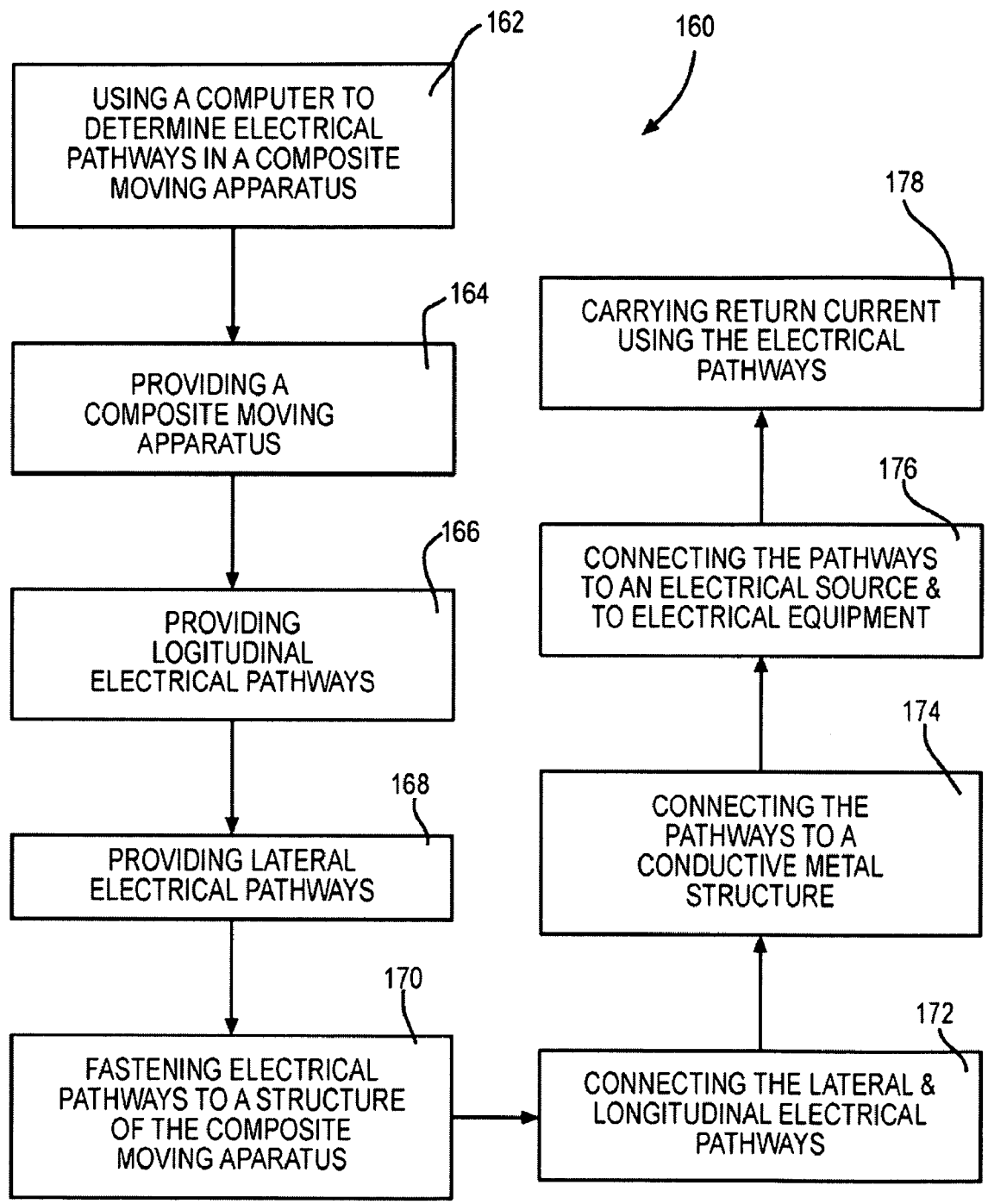
FIG. 2 is a flowchart of one embodiment of a method of providing conductive electrical pathways in a composite moving apparatus.

FIG. 2 is a flowchart of one embodiment of a method 160 of providing conductive electrical pathways 16, 20, and 24 in a composite moving apparatus 10. The method 160 may eliminate the necessity of using metallic structures for electrical purposes in the composite moving apparatus 10. The composite moving apparatus 10 may comprise a composite aircraft, a composite ship, a composite spacecraft, a composite satellite, a composite vehicle, and/or another type of composite moving apparatus. In one step 162, a computer program 54 may be used to determine locations, configurations, orientations, sizing, and quantities of lateral and longitudinal conductive electrical pathways 16 and 20 in a composite moving apparatus 10 to be manufactured in order to reduce weight, to meet performance requirements, and to provide comprehensive conductive electrical pathways 24 throughout the composite moving apparatus 10.

In an additional step 164, a composite moving apparatus 10 made substantially of composites 14 may be provided. In another step 166, a plurality of longitudinal conductive electrical pathways 16 extending along a substantial length 18 of the composite moving apparatus 10 may be provided. The provided longitudinal conductive electrical pathways 16 may have been pre-installed in a plurality of sections 56 of the composite moving apparatus 10. Two or more of the longitudinal conductive electrical pathways 16 may be parallel to provide path redundancy. In other embodiments, the longitudinal conductive electrical pathways 16 may be disposed in varying arrangements. In an additional step 168, a plurality of lateral conductive electrical pathways 20 extending along a substantial lateral width 22 of the composite moving apparatus 10 may be provided. In other embodiments, the lateral conductive electrical pathways 20 may be disposed in varying arrangements. In one embodiment, the provided lateral conductive electrical pathways 20 may have been pre-installed in a plurality of sections 56 of the composite moving apparatus 10. Two or more of the lateral conductive electrical pathways 20 may be parallel to provide path redundancy. The provided lateral and longitudinal conductive electrical pathways 16 and 20 may be made of wire, extruded metal, metal, copper, aluminum, and/or other type of conductive material.

In step 170, the lateral and longitudinal conductive electrical pathways 16 and 20 may be fastened to or supported from a structure 46 of the composite moving apparatus 10. In still another step 172, the longitudinal conductive electrical pathways 16, the lateral conductive electoral pathways 20, and/or other types of electrically conductive structural elements may be connected together using electrical joints 52, or other types of connecting devices, in order to provide redundant electrical pathways 24 extending along a substantial portion 26 of the composite moving apparatus 10. In one embodiment, pre-installed lateral and longitudinal conductive electrical pathways 16 and 20 may be connected when the sections 56 are joined during assembly of the composite moving apparatus 10. The redundant electrical pathways 24 may be adapted to carry alternating and/or direct current return current 28, to carry fault current 29, to provide grounding 30, to earn lightning current 31, to provide electromagnetic shielding 32, to minimize resistance and voltage differential 33, to provide a bleed path 34 for electrostatic charge 35, and/or to carry other types of electrical signals.

In an additional step 174, the longitudinal and lateral conductive electrical pathways 16 and 20 may be connected to at least one conductive metal structure 44 disposed within the composite moving apparatus 10 to utilize the conductive metal structure 44 as part of the conductive electrical pathways 16, 20, and 24. The at least one conductive metal structure 44 may be connected to at least one additional conductive metal structure 44 disposed within the composite moving apparatus 10 to utilize the connected conductive metal structures 44 as part of the conductive electrical pathways 16, 20, and 24. In yet another step 176, the lateral and longitudinal conductive electrical pathways 16 and 20 may be connected to at least one electrical source 48 and to at least one piece of equipment 50 powered by the electrical source 48. The at least one electrical source 48 may comprise at least one of an engine, a battery, a converter, a rectifier unit, a generator, and/or another type of electrical source. The at least one piece of equipment 50 may comprise at least one of navigation equipment, avionics equipment, control equipment, entertainment equipment, communication equipment, lighting equipment, environment control equipment, actuator equipment, power distribution equipment, and/or other type of electrically-controlled equipment.

In an additional step 178, the connected conductive electrical pathways 16, 20, and 24 may be used to carry alternating and/or direct current return current 28, to carry fault current 29, to provide grounding 30, to carry lightning current 31, to provide electromagnetic shielding 32, to minimize resistance and voltage differential 33, and/or to provide a bleed path 34 for electrostatic charge 35.

In other embodiments, one or more of the steps of the method 160 may be altered and/or not followed, the order of the steps may be changed, and/or other steps may be added.

Figure 3:
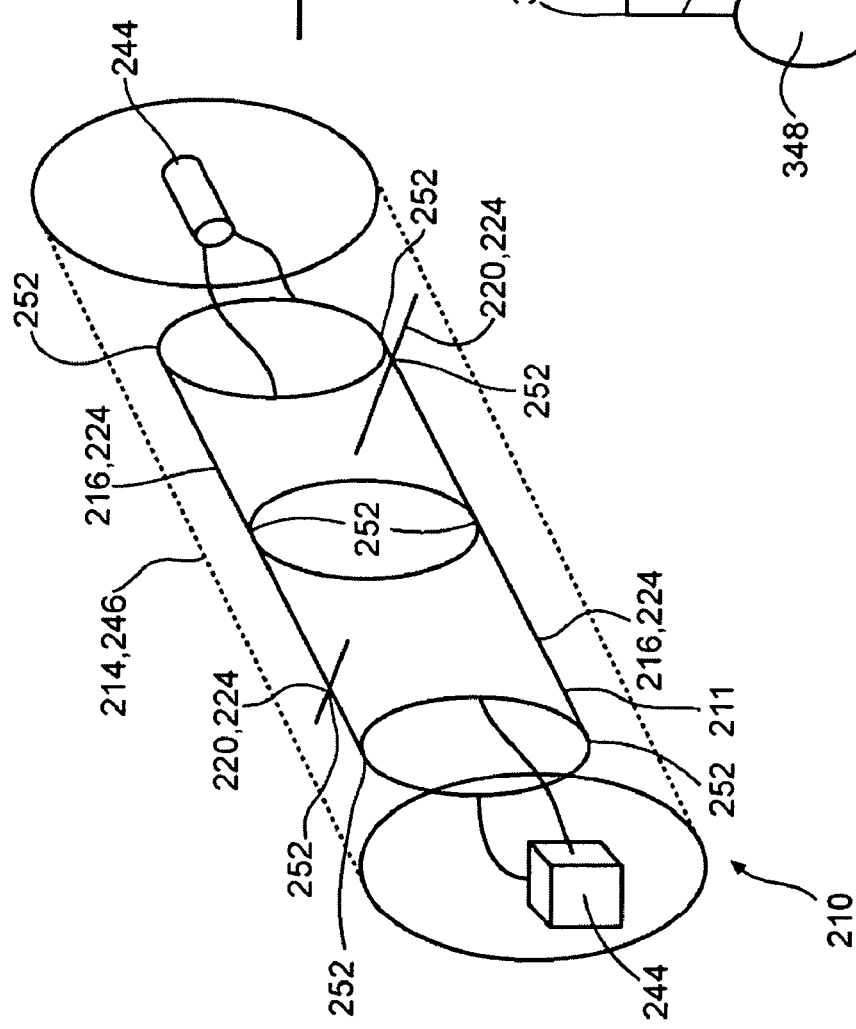
FIG. 3 shows a perspective view of a composite structure.

FIG. 3 shows a perspective view of a generic embodiment of a composite structure 210 to which a current return network 211 may be applied. The composite structure 210 may be made of composites 214 and comprise any type of composite structure including moving structures and non-moving structures. The current return network 211 may comprise longitudinal and lateral conductive electrical pathways 216 and 220 which may be connected to one another in order to provide redundant electrical pathways 224. The electrical pathways 216, 220, and 224 may be connected to at least one conductive metal structure 244 to utilize the structure 244 as part of the electrical pathways 216, 220, and 224 of the current return network 211. The lateral and longitudinal conductive electrical pathways 216 and 220 may be fastened to or supported from a structure 246 of the composite structure 210. Electrical joints 252 may connect the lateral and longitudinal conductive electrical pathways 216 and 220 and/or the at least one conductive metal structure 244.

Figure 4:
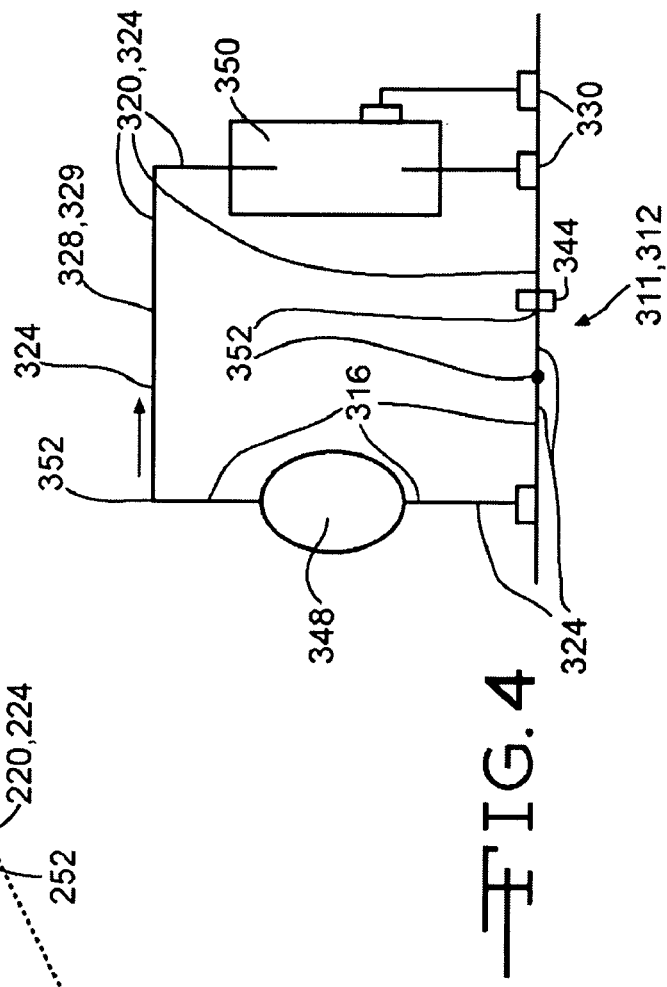
FIG. 4 shows a front view of one embodiment of a current return network implemented in an electrical power circuit within a composite structure.

FIG. 4 shows a front view of one embodiment of a current return network 311 implemented in an electrical power circuit 312 within a composite structure 310 in order to show the role the current return network 311 may play in the electrical power circuit 312. The current return network 311 may comprise interconnected conductive electrical pathways 316 and 320 which may be connected to one another in order to provide redundant electrical pathways 324. Electrical joints 352 may connect the conductive electrical pathways 316 and 320 together and/or at least one conductive metal structure 344. The redundant electrical pathways 324 may be connected to at least one electrical source 348 and may also be connected to at least one piece of equipment 350 powered by the electrical source 348. The redundant electrical pathways 324 may be adapted to carry return alternating and/or direct current return current 328, to carry fault current 329, and/or to provide grounding 330.

One or more embodiments of the disclosure may reduce and/or eliminate one or more problems of one or more of the prior art apparatus and/or methods. For instance, one or more embodiments of the disclosure may provide conductive electrical pathways in composite moving apparatus which do not rely on metal panels and structures in order to keep weight and cost down, which meet performance requirements, which are redundant to accommodate for faults in the system, and which are adapted to handle a variety of functions, such as carrying return alternating and/or direct current, earning fault current, providing grounding, carrying lightning current, providing electromagnetic shielding, minimizing resistance and voltage differential, providing a bleed path for electrostatic charge, and/or earning other types of electrical signals.

It should be understood, of course, that the foregoing relates to exemplary embodiments of the disclosure and that modifications may be made without departing from the spirit and scope of the disclosure as set forth in the following claims.

We claim:

1. A method of providing conductive electrical pathways in a composite moving apparatus comprising:
   providing a composite moving apparatus made substantially of composites;
   providing a plurality of longitudinal conductive electrical pathways extending along a substantial length of the composite moving apparatus;
   providing a plurality of lateral conductive electrical pathways extending along a substantial lateral width of the composite moving apparatus; and
   connecting said longitudinal conductive electrical pathways to said lateral conductive electrical pathways to provide redundant electrical pathways, extending along a substantial portion of the composite moving apparatus, for at least one of carrying return current, carrying fault current, providing grounding, earning lightning current, providing electromagnetic shielding, minimizing resistance and voltage differential, and providing a bleed path for electrostatic charge.

2. The method of claim 1 further comprising the step of connecting said longitudinal conductive electrical pathways and said lateral conductive electrical pathways to at least one conductive metal structure disposed within the composite moving apparatus to additionally utilize the at least one conductive metal structure as part of the conductive electrical pathways.

3. The method of claim 1 wherein the composite moving apparatus comprises at least one of a composite aircraft, a composite ship, a composite spacecraft, a composite satellite, and a composite vehicle.

4. The method of claim 1 wherein the step of providing a plurality of longitudinal conductive electrical pathways comprises providing a plurality of parallel longitudinal conductive electrical pathways to provide pathway redundancy in the event of a failure of one or more of the pathways.

5. The method of claim 1 wherein the step of providing a plurality of lateral conductive electrical pathways comprises providing a plurality of parallel lateral conductive electrical pathways to provide pathway redundancy in the event of a failure of one or more of the pathways.

6. The method of claim 1 wherein the connected conductive electrical pathways are adapted to carry return current, carry fault current ground equipment, provide electromagnetic shielding, carry lightning current, minimize resistance and voltage differential, and provide a bleed path for electrostatic charge.

7. The method of claim 1 wherein the lateral and longitudinal conductive electrical pathways are made of at least one of wire, extruded metal, metal, copper, and aluminum.

8. The method of claim 1 further comprising the step of at least one of fastening and supporting the lateral and longitudinal conductive electrical pathways to a structure of the composite moving apparatus.

9. The method of claim 1 further comprising the steps of connecting said lateral and longitudinal conductive electrical pathways to at least one electrical source and to at least one piece of equipment powered by the electrical source, and using the connected pathways to carry alternating current return current, direct current return current, and fault current.

10. The method of claim 9 wherein the at least one electrical source comprises at least one of an engine, a battery, a converter, a rectifier unit, and a generator, and the at least one piece of equipment comprises at least one of navigation equipment, avionics equipment, control equipment, entertainment equipment, communication equipment, lighting equipment, environment control equipment, actuator equipment, and power distribution equipment.

11. The method of claim 1 wherein the connecting step comprises attaching electrical joints to at least one of the lateral conductive electrical pathways, the longitudinal conductive electrical pathways, and to electrically conductive structural elements in order to connect them.

12. The method of claim 1 further comprising the step of using a computer program to determine locations, configurations, orientations, sizing, and quantities of the lateral and longitudinal conductive electrical pathways in the composite moving apparatus in order to reduce weight, to meet performance requirements, and to provide comprehensive conductive electrical pathways throughout the composite moving apparatus.

13. The method of claim 1 further comprising the steps of pre-installing the lateral and longitudinal conductive electrical pathways in a plurality of sections of the composite moving apparatus, and connecting the pre-installed lateral and longitudinal conductive electrical pathways when the sections are joined during assembly of the composite moving apparatus.

14. The method of claim 1 wherein the method eliminates the necessity of using metallic structures for electrical purposes in the composite moving apparatus.

15. A composite moving apparatus comprising:
a moving apparatus made substantially of composites;
a plurality of longitudinal conductive electrical pathways extending along a substantial length of the composite moving apparatus; and
a plurality of lateral conductive electrical pathways extending along a substantial lateral width of the composite moving apparatus, wherein the longitudinal and lateral conductive electrical pathways are connected for providing redundant electrical pathways extending along a substantial portion of the composite moving apparatus for at least one of earning return current, earning fault current, providing grounding, carrying lightning current, providing electromagnetic shielding, minimizing resistance and voltage differential, and providing a bleed path for electrostatic charge.

16. The composite moving apparatus of claim 15 further comprising at least one conductive metal structure disposed within the composite moving apparatus, wherein the longitudinal and lateral conductive electrical pathways are connected to the at least one conductive metal structure to utilize the at least one conductive metal structure as part of the electrical pathways.

17. The composite moving apparatus of claim 15 wherein the composite moving apparatus comprises at least one of a composite aircraft, a composite ship, a composite spacecraft, a composite satellite, and a composite vehicle.

18. The composite moving apparatus of claim 15 wherein the plurality of longitudinal conductive electrical pathways are parallel to one another to provide pathway redundancy, and the plurality of lateral conductive electric pathways are parallel to one another to provide pathway redundancy.

19. The composite moving apparatus of claim 15 wherein the lateral and longitudinal conductive electrical pathways are made of at least one of wire, extruded metal, metal, copper, and aluminum.

20. The composite moving apparatus of claim 15 wherein the lateral and longitudinal conductive electrical pathways are at least one of fastened to and supported from a structure of the composite moving apparatus.

21. The composite moving apparatus of claim 15 wherein the lateral and longitudinal conductive electrical pathways are connected to at least one electrical source and are also connected to at least one piece of equipment powered by the electrical source, and the connected pathways are for earning alternating current return current, carrying direct current return current, and earning fault current.

22. The composite moving apparatus of claim 15 wherein the at least one electrical source comprises at least one of an engine, a battery, a converter, a rectifier unit, and a generator, and the at least one piece of equipment comprises at least one of navigation equipment, avionics equipment, control equipment, entertainment equipment, communication equipment, lighting equipment, environment control equipment, actuator equipment, and power distribution equipment.

23. The composite moving apparatus of claim 15 wherein electrical joints are attached to both the lateral conductive electrical pathways and the longitudinal conductive electrical pathways in order to connect them.

24. The composite moving apparatus of claim 15 wherein a computer program is used to determine locations, configurations, orientations, sizing, and quantities of the lateral and longitudinal conductive electrical pathways in the composite moving apparatus in order to reduce weight to meet performance requirements, and to provide comprehensive conductive electrical pathways throughout the composite moving apparatus.

25. The composite moving apparatus of claim 15 wherein the lateral and longitudinal conductive electrical pathways are pre-installed in a plurality of sections of the composite moving apparatus, and the pre-installed lateral and longitudinal conductive electrical pathways are connected when the sections are joined during assembly of the composite moving apparatus.

* * * * *